Aug. 26, 1941. P. E. MACK 2,253,634
PULLEY
Filed March 31, 1939 2 Sheets-Sheet 1
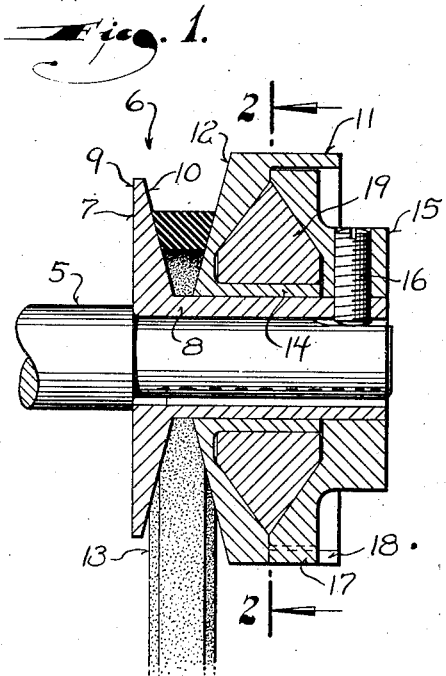
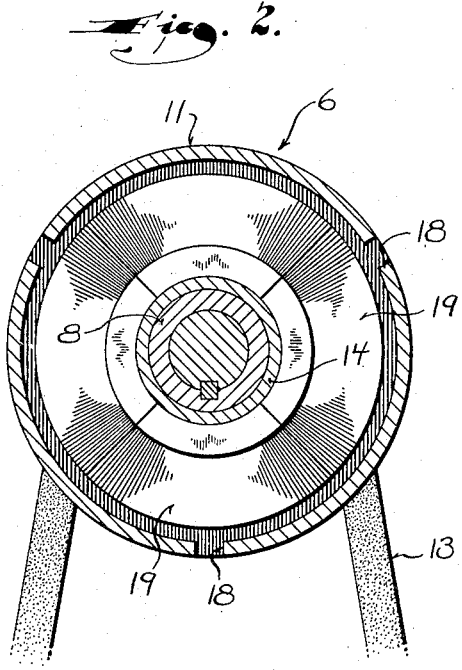
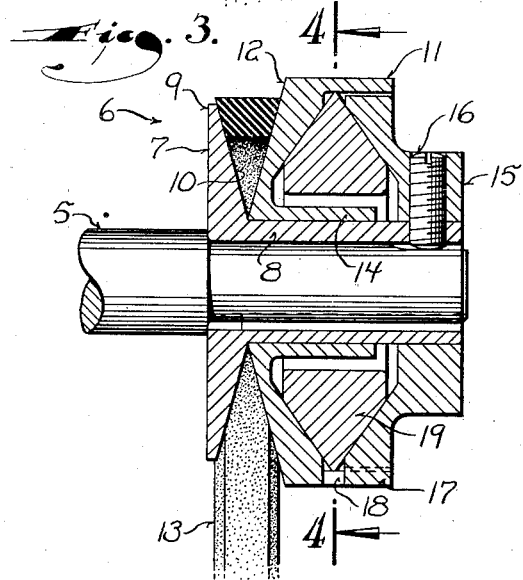
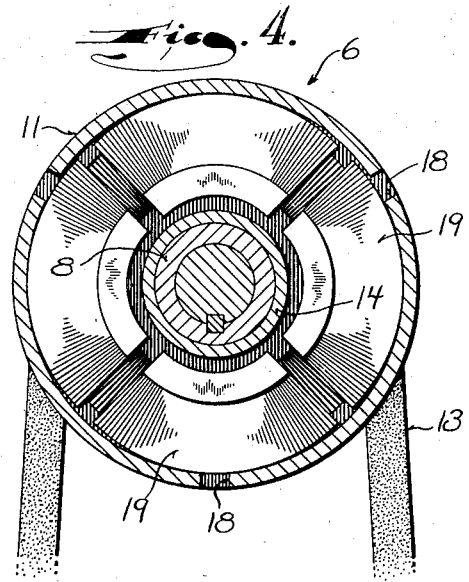
Inventor
Perry E. Mack Aug. 26, 1941.  P. E. MACK  2,253,634
PULLEY
Filed March 31, 1939  2 Sheets-Sheet 2

Inventor
Perry E. Mack

Patented Aug. 26, 1941

2,253,634

UNITED STATES PATENT OFFICE 2,253,634

PULLEY

Perry E. Mack, Milwaukee, Wis., assignor to Briggs & Stratton Corporation, Milwaukee, Wis., a corporation of Delaware Application March 31, 1939, Serial No. 265,245

9 Claims. (Cl. 74—230.17)

This invention relates to pulleys, and refers particularly to grooved pulleys suitable for use with V-belts.

It is an object of this invention to provide a pulley of the character described having an automatically adjustable effective diameter.

Another object of this invention is to provide a pulley of the character described which is so designed that the belt holds the complementary parts of the pulley in positions at which it has a minimum effective diameter, and wherein centrifugally responsive means act to increase the effective diameter of the pulley.

Pulleys of this type are particularly well suited for the power take-off in prime movers, such as internal combustion engines of the small portable type, and with this use in mind, it is another object of the invention to provide a pulley which will automatically reduce the torque at low speeds and increase the torque at high speeds so as to effect a reduction in speed of the prime mover and thereby facilitate acceleration under load and minimize the wear on the prime mover.

Another object of this invention is to provide a pulley of the character described which is extremely simple in construction and in which the only moving parts, the centrifugally responsive means, are housed within the structure of the pulley.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a sectional view through a pulley constructed in accordance with this invention, and showing its parts in the positions occupied when the pulley has a minimum effective diameter;

Figure 2 is a cross sectional view taken through Figure 1 on the plane of the line 2—2;

Figures 3 and 4 are views similar to Figures 1 and 2, but showing the parts in the positions occupied when the pulley has its maximum effective diameter;

Figure 5:
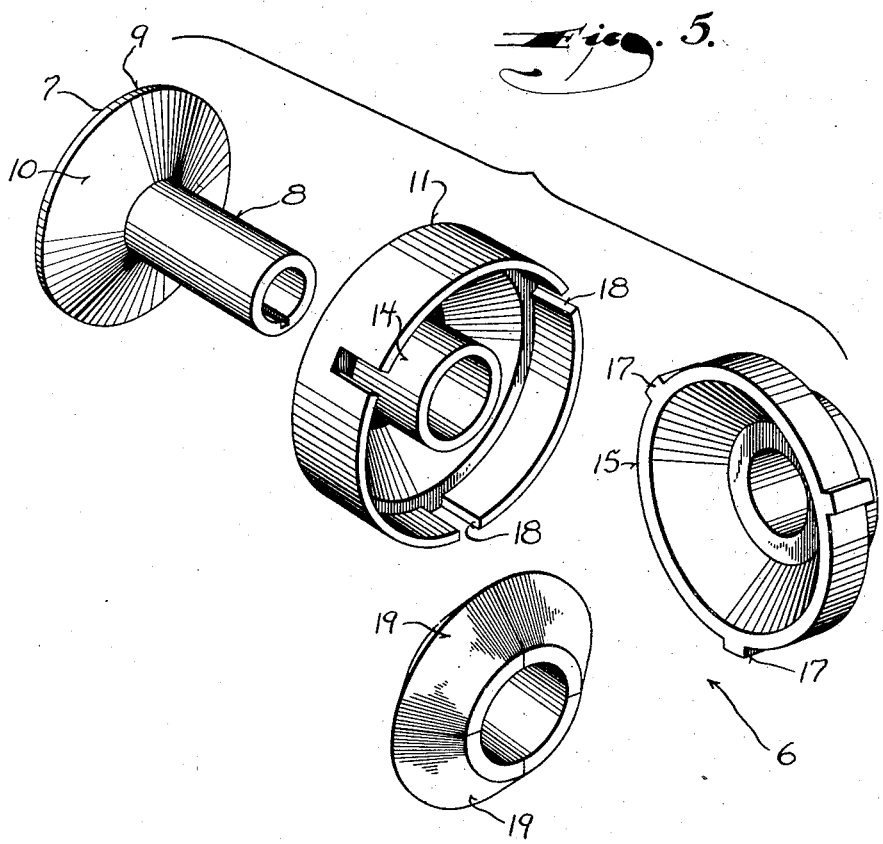
Figure 5 is a perspective view of the several parts of the pulley, shown disassembled.

Referring now particularly to the accompanying drawings in which like numerals indicate like parts, the numeral 5 designates a shaft, which may be either a driving or driven shaft, and upon which the automatically adjustable pulley 6 of this invention is mounted. The pulley comprises a stationary section 7 consisting of a hub 8 and an annular flange 9, the inner face 10 of which is conical. Slidable axially on the hub 8 is a movable section in the form of a cone 11, the conical face 12 of which is opposed to that of the flange to coact therewith in the formation of a substantially V-shaped pulley groove for the reception of a V-belt 13.

The cone 11 is substantially cup-shaped, as best shown in Figure 5, and has a central bushing 14, the bore of which slidably fits the hub 8. A collar 15 secured to the shaft 5 and the hub 8 by a set screw 16 closes the open face of the cup-shaped cone. On the outer periphery of this collar there are three equispaced longitudinal keys or lugs 17, which slide in longitudinal grooves 18 formed in the outer wall of the cone to hold the cone against rotation with respect to the shaft.

Figure 6:
Figure 6 is a perspective view of one of the centrifugally responsive elements.

The inner faces of the cone and the collar are conical to form an annular wedge in which centrifugally responsive weights 19 are positioned. These centrifugally responsive weights may be of any suitable construction, but preferably are in the form of segments, as best shown in Figure 6. They are retained in position solely by being confined between the cone and the collar and are acted upon by centrifugal force to push the cone toward the flange and thereby increase the effective diameter of the pulley.

The action of these centrifugally responsive elements is opposed by the tension of the belt 13 so that at slow speeds, the effective diameter of the pulley is minimum, as shown in Figures 1 and 2.

As will be clear from the drawings when the cone 11 moves toward the annular flange 9 to increase the effective diameter of the pulley, the rotation of the pulley draws the belt outward to contact the V-groove at a larger diameter.

It is particularly significant that the only moving parts in the entire structure are the centrifugally responsive weights, and these are entirely enclosed by the cone and the collar.

From the foregoing description taken in connection with the accompanying drawings, it will be readily apparent that while the pulley of this invention has many applications, it is particularly well adapted for use as the driving pulley of small portable gas engines, for through it a desirable driving ratio is automatically coordinated with the power factor of the engine.

What I claim as my invention is:

1. A pulley of the V-groove type having an adjustable effective diameter comprising: a hub having an annular flange, the inner face of which is conical; a cone slidable on the hub and having a conical surface opposed to the conical face of the flange to coact therewith in the formation of a substantially V-shaped groove; means on the hub engaged with the cone at a point ubstantially no less distant from the center of rotation of the pulley than the widest portion of the V-shaped groove for establishing a non-rotatable driving connection between the cone and hub while permitting axial sliding motion of the cone on said hub; and centrifugally responsive means for sliding the cone axially toward the flange.

2. A pulley of the character described comprising: a hub having an annular flange, the inner face of which is conical; a cone slidable on the hub with its conical surface opposed to that of the flange to coact therewith in the formation of a substantially V-shaped pulley groove; means on the hub engaged with the cone adjacent to its point of largest diameter for establishing a non-rotatable driving connection between the cone and hub while permitting axial sliding motion of the cone on the hub; and centrifugally responsive means reacting against said last-named means and acting on the cone for sliding the cone toward the flange.

3. A pulley of the character described comprising: a hub having an annular flange, the inner face of which is conical; a hollow cone slidable on the hub with its conical surface opposed to that of the flange to coact therewith in the formation of a substantially V-shaped pulley groove; means on the hub engaged with the cone remote at a point substantially no less distant from the center of rotation of the pulley than the widest portion of the V-shaped groove for establishing a non-rotatable driving connection between the cone and hub while permitting axial sliding motion of the cone on the hub; and centrifugally responsive means reacting against said last-named means and acting on the cone for sliding the cone toward the flange, said centrifugally responsive means being enclosed by the cone and the means which drivingly connects the cone for rotation with the hub.

4. A pulley of the character described comprising: a hub having an annular flange, the inner face of which is conical; a hollow cone slidable on the hub with its conical surface opposed to that of the flange to coact therewith in the formation of a substantially V-shaped pulley groove; a collar fixed to the hub and closing the outer open side of the hollow cone; a connection between the collar and the cone substantially at the point of largest diameter of the cone for drivingly connecting the cone with the hub, said connection permitting axial sliding motion of the cone on the hub; centrifugally responsive means enclosed by the hollow cone and said collar; and means cooperating with the centrifugally responsive means, the hollow cone, and said collar whereby the centrifugally responsive means slides the hollow cone toward the flange when the speed of rotation of the pulley reaches a predetermined value.

5. A pulley of the character described comprising: a hub having an annular flange, the inner face of which is conical; a hollow cone movable on the hub with its conical surface opposed to that of the flange to coact therewith in the formation of a subsantially V-shaped pulley groove; a part fixed to the hub adjacent to the hollow cone; a connection between said part and the cone for constraining relative movement of the cone to axial sliding motion on the hub, said connection being located at a radial distance from the center of rotation of the pulley substantially no less than the radial distance of the widest portion of the V-shaped groove from the center of rotation; and weighted segments confined between said part and an inner wall of the hollow cone, said weighted segments being responsive to centrifugal force and reacting on said inner wall of the hollow cone to slide the hollow cone toward the flange.

6. A pulley of the character described comprising: an annular flange having one conical surface; a hollow cone mounted to move axially toward and from the flange with its conical surface opposite that of the flange so as to coact therewith in the formation of a substantially V-shaped pulley groove having an effective diameter depending upon the axial relationship between the hollow cone and the flange; a cover member closing the open face of the hollow cone and fixed with respect to the flange; a spline connection between the cover member and the hollow cone adjacent to the point of largest diameter of the hollow cone and constraining the same to axial sliding motion toward and from the flange while drivingly connecting the cone with the flange; and centrifugally responsive means reacting against said cover member and the hollow cone to move the cone toward the flange.

7. In combination: a shaft; a pulley mounted on the shaft and having a substantially V-shaped peripheral groove, one wall of said groove being fixed with respect to the shaft and the other wall being movable axially with respect thereto to vary the effective diameter of the pulley; a rotation transmitting connection between said fixed pulley wall and the movable pulley wall through which rotative force is applied to the movable pulley wall at a point substantially no less distant from the axis of the shaft than the widest portion of the V-shaped groove, said connection permitting axial movement of the movable pulley wall toward and from said fixed pulley wall; a belt trained over the pulley and normally holding the movable wall of the pulley away from the fixed wall thereof so that the pulley normally has a small effective diameter; and centrifugally responsive means acting upon the movable wall of the pulley to force the same toward the fixed wall and increase the effective diameter of the pulley.

8. A pulley of the V-groove type having an adjustable effective diameter comprising: two complementary axially arranged pulley parts forming a substantially V-shaped groove; means engaged with one of said pulley parts adjacent to its point of largest diameter and connected with the other of said pulley parts for drivingly connecting said parts while permitting relative axial movement therebetween; and segmental centrifugally responsive means adapted to press one of said parts toward the other at spaced points about its center whereby the parts approach each other as the speed of the pulley increases and by their rotation, draw a belt disposed in the V-groove outwardly to contact the groove at a larger diameter.

9. A rotatable drive member having an adjustable effective diameter comprising: two complementary axially arranged relatively movable parts having opposed conical faces to form substantially a V-shaped groove in which a belt is adapted to be drivingly connected during any disposition of the complementary parts; means for constraining relative movement between said parts to axial motion, including a rotation transmitting member connected with one of said parts at a radial distance from the center of rotation of the drive member substantially no less than the radial distance of the widest portion of the V-shaped groove from the center of rotation; and means influenced by the speed of the drive member as it is rotated for effecting adjustment of the positions of the complementary parts axially with respect to each other to vary the effective diameter of the drive member.

PERRY E. MACK.

CERTIFICATE OF CORRECTION.

Patent No. 2,253,634. August 26, 1941.

PERRY E. MACK.

It is hereby certified that error appears in the printed specification of the above numbered patent requiring correction as follows: Page 2, first column, line 45, claim 3, strike out the word "remote"; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.